United States Patent
Nakai

(10) Patent No.: US 10,847,957 B2
(45) Date of Patent: *Nov. 24, 2020

(54) EXTERIOR STRUCTURE FOR WIRE HARNESS, MANUFACTURING METHOD THEREOF, AND WIRE HARNESS

(71) Applicant: SUMITOMO WIRING SYSTEMS, LTD., Mie (JP)

(72) Inventor: Hirokazu Nakai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,231

(22) Filed: Oct. 29, 2019

(65) Prior Publication Data

US 2020/0067292 A1 Feb. 27, 2020

Related U.S. Application Data

(63) Continuation of application No. 15/405,727, filed on Jan. 13, 2017, now Pat. No. 10,468,862.

(30) Foreign Application Priority Data

Jan. 18, 2016 (JP) .................. 2016-006743

(51) Int. Cl.
*H02G 3/00* (2006.01)
*H02G 3/04* (2006.01)
*B60R 16/02* (2006.01)
*H01B 7/00* (2006.01)
*B60K 1/04* (2019.01)

(52) U.S. Cl.
CPC ....... *H02G 3/0481* (2013.01); *B60R 16/0215* (2013.01); *H01B 7/0045* (2013.01); *B60K 1/04* (2013.01); *B60Y 2200/92* (2013.01); *B60Y 2400/61* (2013.01); *Y10S 903/904* (2013.01)

(58) Field of Classification Search
CPC ......................... H02G 3/0481; B60R 16/0215; H01B 7/0045; B60K 1/04; B60Y 2200/92; B60Y 2400/61; Y10S 903/90
See application file for complete search history.

(56) References Cited

U.S. PATENT DOCUMENTS

| | | | | |
|---|---|---|---|---|
| 4,814,547 A * | 3/1989 | Riley | ................. | H02G 3/0675 174/653 |
| 6,042,396 A * | 3/2000 | Endo | ................. | H01R 9/0527 174/652 |

(Continued)

FOREIGN PATENT DOCUMENTS

JP 2014-082909 A 5/2014

*Primary Examiner* — Pete T Lee
(74) *Attorney, Agent, or Firm* — Oliff PLC

(57) ABSTRACT

An exterior structure for a wire harness is provided with a pipe that has an electric wire insertion space that allows an electric wire to be inserted through the inside of the pipe. The pipe includes a diameter reduction portion that is defined by an inward deformation of the pipe in a diameter direction that narrows the electric wire insertion space. In the diameter reduction portion, the clearance between (i) the electric wire that is inserted through the electric wire insertion space of the pipe and (ii) the inner circumferential surface of the pipe can be reduced or eliminated, which suppresses rattling of the electric wire.

4 Claims, 5 Drawing Sheets

(56) References Cited

U.S. PATENT DOCUMENTS

| | | | |
|---|---|---|---|
| 6,053,749 | A | 4/2000 | Masuda et al. |
| 7,094,970 | B2 | 8/2006 | Kihira |
| 8,787,743 | B2 | 7/2014 | Sekido |
| 2004/0144557 | A1 | 7/2004 | Miyazaki |
| 2013/0140054 | A1 | 6/2013 | Kato et al. |
| 2013/0306346 | A1 | 11/2013 | Izawa et al. |
| 2015/0008032 | A1* | 1/2015 | Nakai .................. H02G 3/0468 174/650 |
| 2015/0008252 | A1* | 1/2015 | Nakai ...................... B23K 1/06 228/110.1 |
| 2015/0179312 | A1 | 6/2015 | Inao et al. |
| 2015/0222103 | A1 | 8/2015 | Inao et al. |

\* cited by examiner

EXTERIOR STRUCTURE FOR WIRE HARNESS, MANUFACTURING METHOD THEREOF, AND WIRE HARNESS

BACKGROUND

This invention relates to an exterior structure for a wire harness, a manufacturing method thereof, and a wire harness.

Conventionally, in a hybrid car or the like, in a wire harness that is wired between (i) a battery or the like arranged at a vehicle rear portion and (ii) an inverter or the like arranged at a vehicle front portion, wires are inserted through a metal pipe so as to protect and shield the wires (see, for example, JP-A-2014-82909). The pipe is bent in a specified shape corresponding to the wiring path.

SUMMARY

In the above case, there was a risk that noise and/or damage might occur because the wires rattle within the pipe due to vehicle vibration or the like.

This invention reflects on the above situation. An object of embodiments of this invention is to provide an exterior structure for a wire harness, a manufacturing method thereof, and a wire harness that can suppress generation of noise and/or damage due to rattling of the wires.

An exterior structure for a wire harness of embodiments of this invention is provided with a pipe having a wire insertion space, in which wires can be inserted through the inside of the pipe, wherein a diameter reduction portion that is bent inward in a diameter direction and reduces the wire insertion space is arranged in the pipe.

Additionally, a wire harness of embodiments of this invention is provided with (i) a pipe having a wire insertion space in which wires can be inserted through the inside of the pipe, (ii) a tubular shielding member that covers the periphery of the wires that extend from an end portion of the pipe and is attached to an outer circumferential surface of the end portion of the pipe, and (iii) an annular member that fixes the shielding member to the outer circumferential surface of the end portion of the pipe, wherein a diameter reduction portion that is bent inward in a diameter direction and reduces the wire insertion space is arranged at the end portion of the pipe, and the annular member is externally engaged and fixed to a reduced diameter portion at the outer circumferential surface of the diameter reduction portion, with the shielding member being between the annular member and the reduced diameter portion.

According to the exterior structure for a wire harness described above, in the diameter reduction portion, a clearance between the wires and the inner circumferential surface of the pipe is reduced or eliminated. Thus, rattling of the wires in the pipe can be suppressed, and generation of noise and/or damage can be suppressed.

Furthermore, according to the wire harness described above, in addition to suppressing generation of noise and/or damage due to rattling of the wires, an annular member can be used as a fixing device that fixes a shielding member to the pipe.

DETAILED DESCRIPTION OF EMBODIMENTS

The following shows exemplary embodiments of this invention.

In the above-mentioned exterior structure for a wire harness, the annular member may be externally engaged and fixed to a reduced diameter portion of an outer circumferential surface of the diameter reduction portion. Because of this, the annular member does not significantly extend to the outer circumferential side, and therefore the exterior structure can be kept from becoming large.

In a method of manufacturing an exterior structure for a wire harness having the above-described annular member, the annular member is passed over the outside of the pipe, to an intermediate portion of the pipe in a longitudinal direction. In that state, by causing a diameter of the annular member to be reduced, the intermediate portion of the pipe in the longitudinal direction is caused to be compressed and deformed in a diameter reduction direction, and the diameter reduction portion is formed. Thus, the diameter reduction portion can be easily manufactured as the diameter of the annular member is reduced.

In the above-described method of manufacturing an exterior structure for a wire harness, the diameter of the annular member may be reduced and deformed over an entire circumference of the annular member. Because of this, the annular member does not partially protrude to the outer circumferential side, so the exterior structure can be kept from becoming large.

Additionally, in the above-described wire harness, a tubular covering member that covers the outside of the annular member may be fixed to the pipe. Additionally, the annular member may be externally engaged to a reduced diameter portion of the outer circumferential surface of the diameter reduction portion, and thereby does not significantly extend to the outer circumferential side. Thus, this can suppress the covering member that covers the outside of the annular member from becoming large. As a result, for example, if the covering member is a grommet, and the wire harness is arranged under the floor of a vehicle, interference of the grommet with a surface under the floor of the vehicle can easily be avoided.

Furthermore, the above-mentioned wire harness may have a configuration in which the end portion of the pipe expands toward the open end. In this configuration, the wires extended from the end portion of the pipe can be suppressed from contacting the open end of the pipe and being damaged. In particular, according to the above-described method of manufacturing an exterior structure for a wire harness, a configuration becomes such that as the diameter reduction portion is compressed and deformed, the end portion of the pipe expands toward the open end. Thus, there is no need for any special processing.

Embodiment 1

Figure 3:
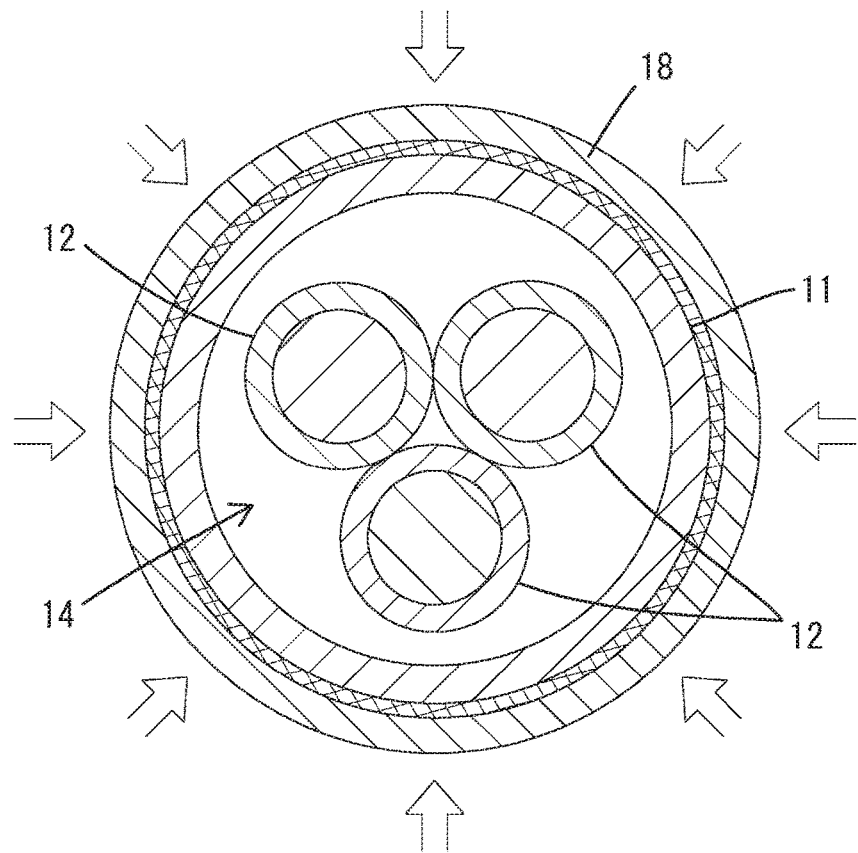
FIG. 3 is a cross-sectional view in a front view direction showing a state in which wires are inserted through a pipe, and before a diameter of an annular member is reduced.
Figure 4:
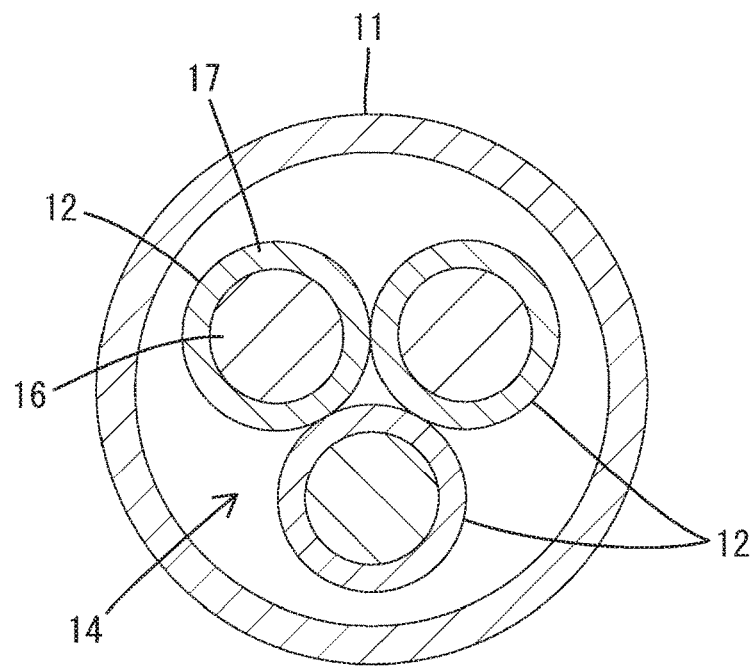
FIG. 4 is a cross-sectional view in a front view direction showing a state in which wires are inserted through the pipe, before a diameter reduction portion is formed.
Figure 5:
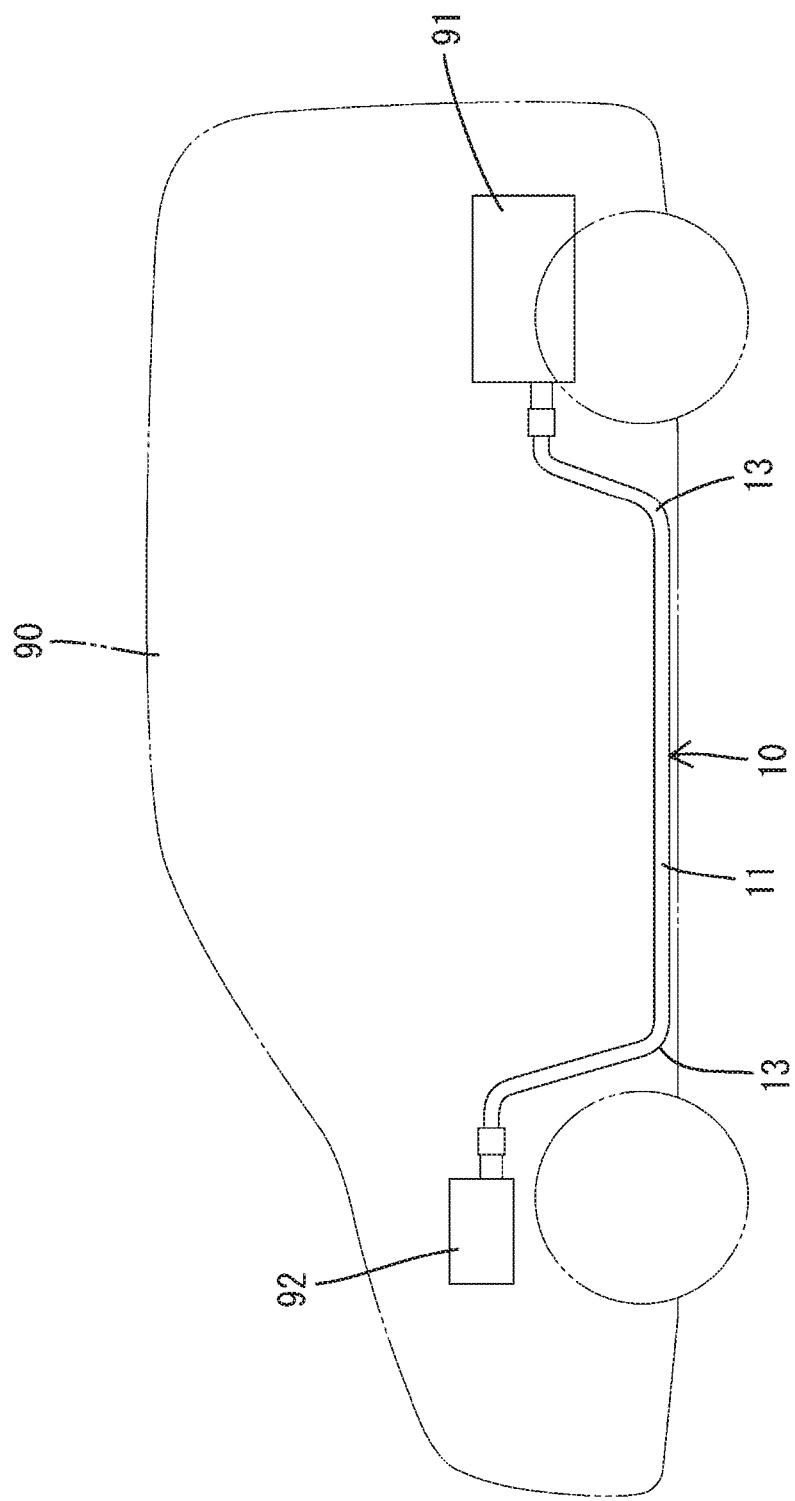
FIG. 5 is a schematic view showing a wiring path of a wire harness.

The following explains embodiment 1, based on FIGS. 1-5. As shown in FIG. 5, in a vehicle 90 such as a hybrid vehicle or the like, a wire harness 10 related to embodiment 1 connects (i) a device 91 such as a high voltage battery or the like arranged at a rear portion of the vehicle 90 and (ii) a device 92 such as an inverter, a fuse box, or the like arranged at a front portion of the vehicle 90. Thus, the wire harness 10 is arranged under the floor of the vehicle 90. Additionally, devices 91, 92 are housed in undepicted conductive shielding cases.

Figure 1:
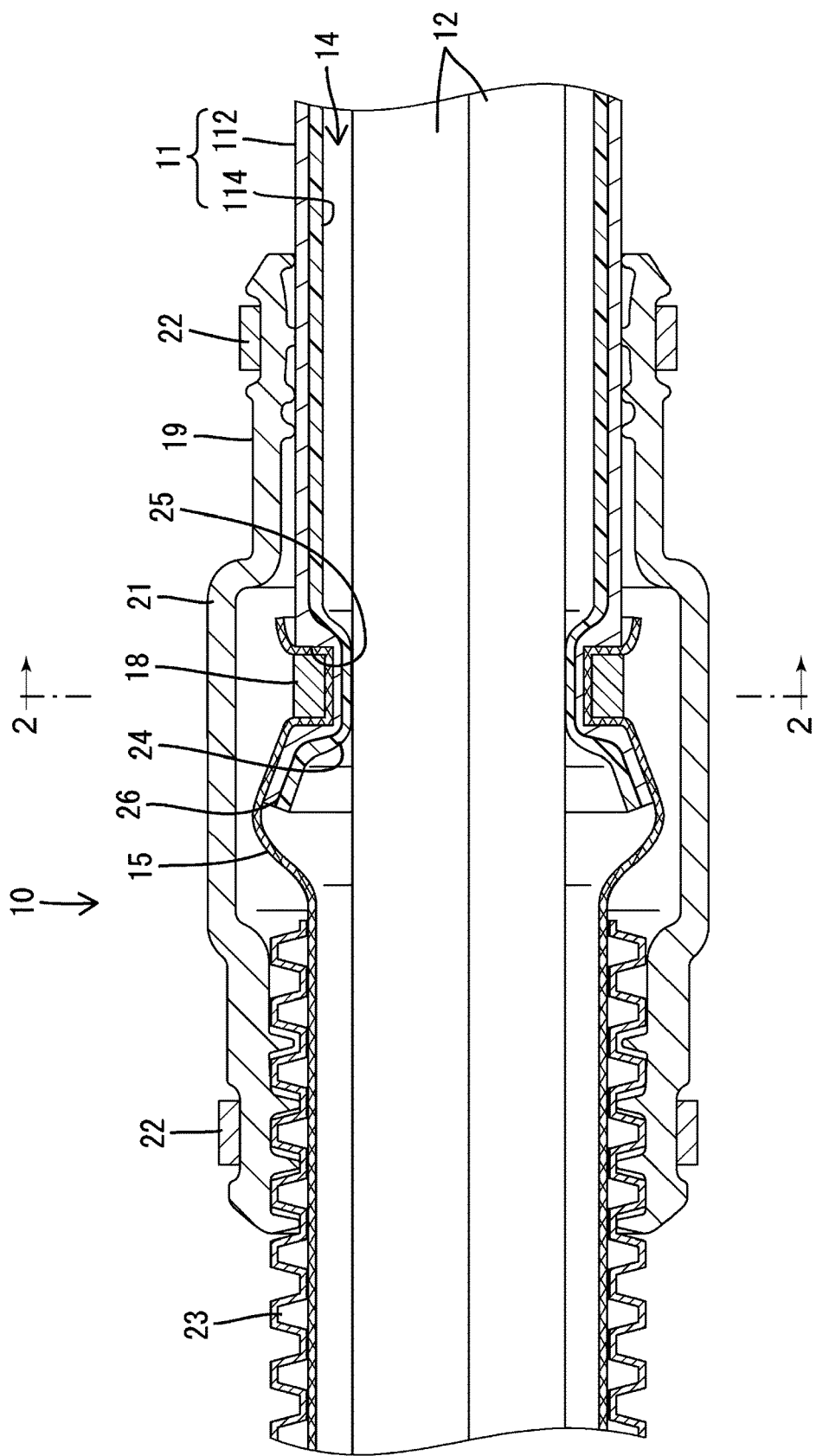
FIG. 1 is a cross-sectional view of main parts of a wire harness in a side view direction related to embodiment 1 of this invention.

The wire harness 10 is provided with (i) a pipe 11 (shielding pipe) that constitutes an exterior structure and (ii) a plurality of electric wires 12 (three electric wires for embodiment 1) that are inserted through the pipe 11. As shown in FIG. 1, the pipe 11 may be a composite tube in which a metal layer 112 and a resin layer 114 are layered.

As shown in FIG. 4, the electric wires 12 are non-shielded electric wires in which outer circumferences of conductors 16 are enveloped by insulating coatings 17. End portions of the electric wires are connected to undepicted terminal metal fittings. The terminal metal fittings are housed in undepicted connectors that are connected to the corresponding devices 91, 92.

The pipe 11 may be formed of metal such as iron, aluminum, copper, stainless steel, or the like, and may be constituted as a rigid pipe material that holds a fixed shape by itself. The pipe 11 may be cylindrical in cross section, may be in a shape that extends along a wiring path of the electric wires 12, and may be provided with bent portions 13 (see FIG. 5) at intermediate portions along its length. Both ends in the length direction are open. The inside of the pipe 11 constitutes an electric wire insertion space 14 that is round in cross section, through which the plurality of electric wires 12 can be inserted as a bundle.

As shown in FIG. 1, portions of the electric wires 12 that extend to the outside from the end portion of the pipe 11 are bundled together and enveloped by a tubular shielding member 15. The shielding member 15 may be constituted by flexible braided wires in which conductive thin metal wires of copper or the like are braided in a mesh form. Here, other than braided wires, metal foil can also be used for the shielding member 15.

One end of the shielding member 15 is crimped and conductively fixed to the outer circumferential surface of the end portion of the pipe 11 by an annular member 18. Additionally, the one end of the shielding member 15 is covered by a grommet 19. The grommet 19 may be made of rubber, may have a circular tube shape, and may have a swelling portion 21 that swells outward in a diameter direction, at an intermediate portion of the grommet in the longitudinal direction. At the inside of the swelling portion 21, the one end of the shielding member 15 and the annular member 18 are arranged so as not to contact the grommet 19. End portions of the grommet 19 in the longitudinal direction are respectively fixed, by metal rings 22, to (i) an end portion of the pipe 11 and (ii) a corrugated tube 23. The corrugated tube 23 is made of resin and forms a tubular shape having a bellows-shaped peripheral wall portion, and the shielding member 15 is inserted through the inside of the corrugated tube 23. Furthermore, the other end of the shielding member 15 is conductively fixed to an undepicted connector.

A diameter reduction portion 24 that is bent inward over the entire circumference of the pipe 11 in the diameter direction is arranged at an end portion (open end side) of the pipe 11. The spatial area of the electric wire insertion space 14 of the pipe 11 is narrower at the diameter reduction portion 24 than at locations before and after the diameter reduction portion 24. In short, the electric wire insertion space 14 of the pipe 11 is reduced at the diameter reduction portion 24.

Figure 2:
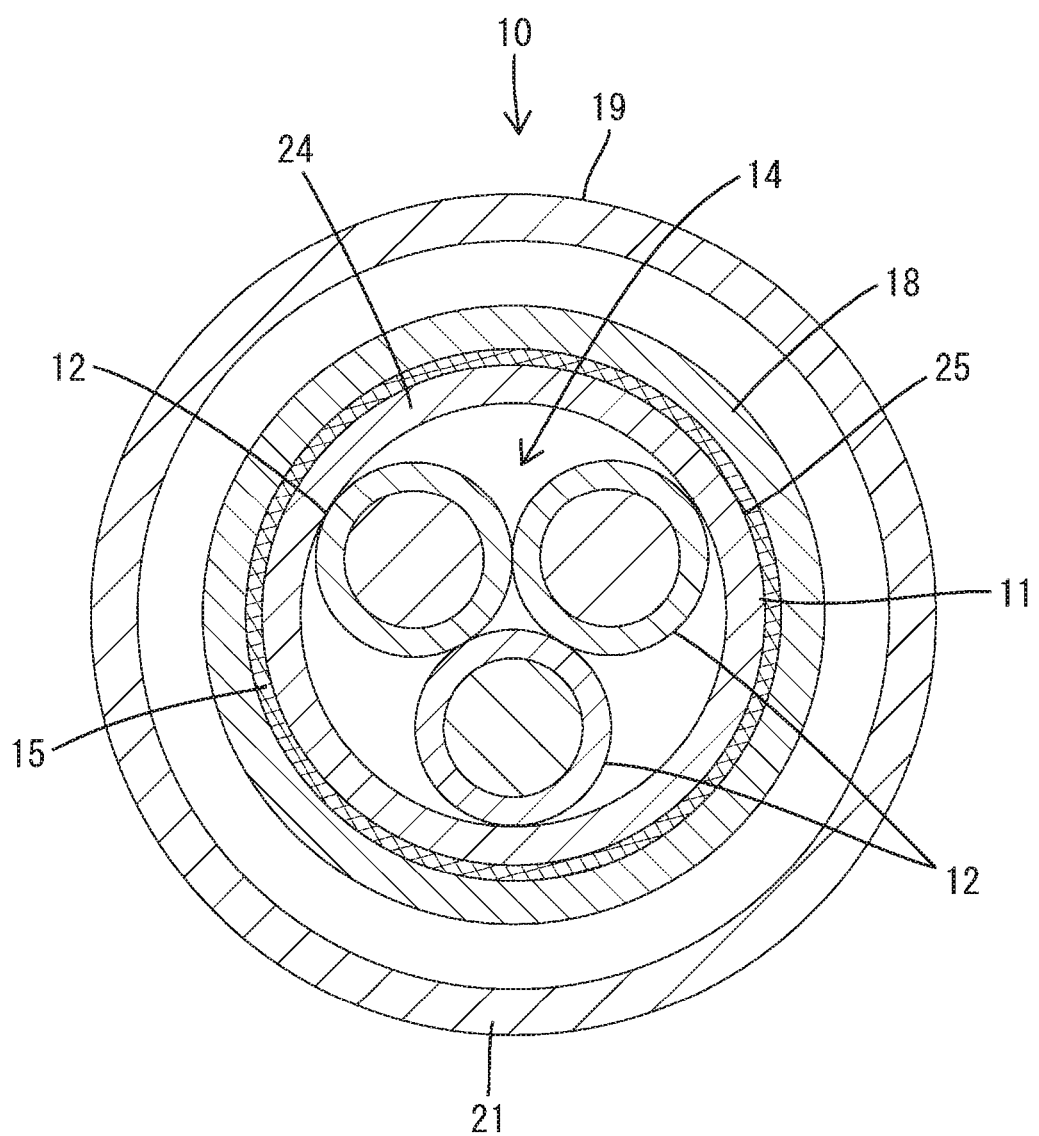
FIG. 2 is a cross-sectional view of the wire harness in a front view direction, taken along section line 2-2 of FIG. 1.

At the outer circumferential surface of the diameter reduction portion 24, a concave groove 25 that is depressed in a diameter reduction direction is formed over the entire circumference of the diameter reduction portion 24, and furthermore, the annular member 18 is externally engaged and fixed in a configuration in which it fills the concave groove 25. The annular member 18 may be of metal and may form a ring shape that is round in cross section, and may be constituted so as to be continuous in a circumferential direction as shown in FIG. 2. Additionally, the annular member 18 may have a substantially constant thickness over its entire circumference. The thickness may be the same as or slightly larger than a depth of the concave groove 25. As shown in FIG. 1, one end of the shielding member 15 may be sandwiched and fixed between the annular member 18 and the groove surface of the concave groove 25. At an end portion of the pipe 11, an expansion portion 26 may be arranged, which is expanded in a fan shape from the diameter reduction portion 24 toward the open end of the pipe 11.

Here, as the diameter of the annular member 18 is reduced, the diameter reduction portion 24 itself is also reduced in diameter and formed. Additionally, as the diameter of the annular member 18 is reduced, the expansion portion 26 is expanded in diameter and formed.

In an exemplary manufacturing method, first, the electric wires 12 are inserted through the pipe 11, and the end portion of the pipe 11 is covered by one end of the shielding member 15 (the diameter reduction portion 24 is not yet formed). Subsequently, positions are aligned such that the annular member 18, which is passed over the pipe 11 in advance, is made to move to the covering portion of the shielding member 15. Next, as shown in FIGS. 3 to 2, a compressive force is applied to the annular member 18 in a diameter reduction direction from multiple positions at the outer circumferential side by an undepicted press mold, and the annular member 18 is made to be substantially evenly reduced in diameter and deformed over its entire circumference. By so doing, the entire circumference of the diameter reduction portion 24 protrudes inward in the diameter direction. The protrusion amount (deformation amount) of the diameter reduction portion 24 is substantially constant over the entire circumference.

As shown in FIG. 1, one end of the shielding member 15 is caused by the annular member 18 to lie along the groove surface of the concave groove 25, and is sandwiched in a crank shape between the annular member 18 and the pipe 11. Thus, the shielding member 15 is firmly fixed to the pipe 11, and does not easily slip from the pipe 11. Furthermore, as a reaction force against the deformation force that causes the diameter of the diameter reduction portion 24 to be reduced, the open end of the end portion of the pipe 11 is made to be expanded; thus, the expansion portion 26 is also formed along with the diameter reduction portion 24.

Subsequently, the grommet 19, which was passed over the pipe 11 in advance, is moved to a position at which the outer circumferential surface of the corrugated tube 23 and the outer circumferential surface of the end portion of the pipe 11 are covered. By so doing, the grommet 19 is mounted so as to bridge over the end portion of the pipe 11 and the corrugated tube 23. Finally, by tightening the metal rings 22, the grommet 19 is fixed to the end portion of the pipe 11 and to the corrugated tube 23, and the fixing of the grommet 19 is complete.

Here, the electric wire insertion space 14 of the pipe 11 is narrowed at the diameter reduction portion 24. As shown in FIGS. 1 and 2, the electric wires 12 are arranged in contact with the inner circumferential surface of the diameter reduction portion 24 and are held by the diameter reduction portion 24. Naturally, if the protrusion amount of the diameter reduction portion 24 is small, the electric wires 12 may be arranged such that there is a slight gap between the electric wires 12 and the diameter reduction portion 24, and so that they can contact the inner circumferential surface of the diameter reduction portion 24.

For example, after the pipe 11 is arranged under the floor of the vehicle 90, even if vibration is generated in the vehicle 90, free movement of the electric wires 12 in the diameter reduction portion 24 in the diameter direction is restricted, so the electric wires 12 do not significantly rattle within the pipe 11, and generation of noise and/or damage can be suppressed.

Additionally, the annular member 18 is externally engaged to the concave groove 25 of the pipe 11, so a portion of the annular member 18 that protrudes outward from the outer circumferential surface of the end portion of the pipe 11 can be reduced or eliminated. For example, after the annular member 18 is reduced in diameter, an outer circumferential surface of the annular member 18 may have substantially the same diameter as the outer circumferential surface of a portion of the pipe 11 that is separated from the diameter reduction portion 24. Thus, the swelling amount of the swelling portion 21 of the grommet 19, inside of which the annular member 18 is arranged, can be made small. As a result, contact between the swelling portion 21 of the grommet 19 and the surface under the floor of the vehicle 90 can easily be avoided, and the pipe 11 can be made closer to the surface under the floor of the vehicle 90 than was possible conventionally.

Additionally, the annular member 18 is externally engaged in the concave groove 25 of the pipe 11, so a large concave and convex shape is not formed at the outer circumferential surface of the end portion of the pipe 11. Thus, for example, an undepicted heat shrinkable tube or the like can be attached to the periphery of the outer circumferential surface of the end portion of the pipe 11.

Additionally, as the diameter of the annular member 18 is reduced, the diameter reduction portion 24 and the expansion portion 26 are simultaneously formed. Thus, there is no need for any special processing, and productivity is excellent.

Furthermore, the open end of the end portion of the pipe 11 is expanded by the expansion portion 26. Thus, for example, even if the electric wires 12 extended from the end portion of the pipe 11 rattle in a direction crossing the axial direction, it becomes difficult for the electric wires 12 to contact the open end of the end portion of the pipe 11, and damage to the electric wires 12 by the edge of the open end can be suppressed.

Embodiment 2

Figure 6:
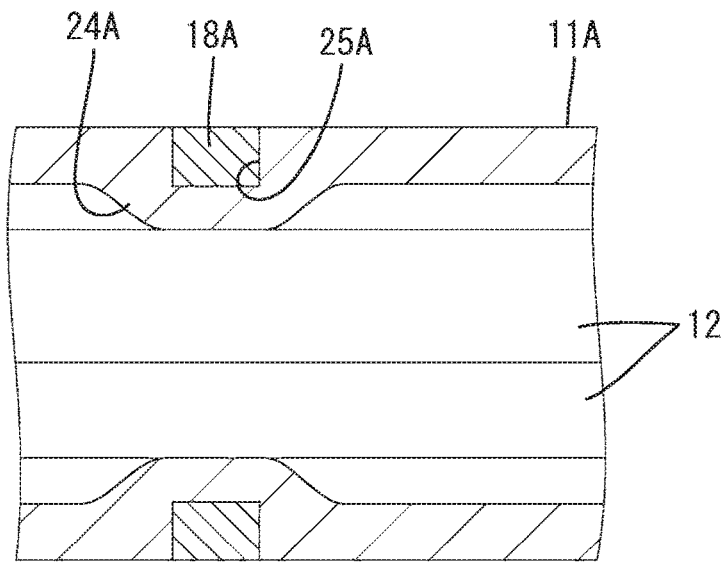
FIG. 6 is a cross-sectional view of main parts of a wire harness in a side view direction related to embodiment 2 of this invention.

FIG. 6 shows embodiment 2 of this invention.

A diameter reduction portion 24A of this case is arranged at an intermediate portion in a longitudinal direction, instead of at an end portion of a pipe 11A. The pipe 11A is of a non-shielding type and is not provided with something corresponding to the expansion portion 26 of embodiment 1. In the same manner as in embodiment 1, an annular member 18A is externally engaged and fixed to a concave groove 25A that becomes a reduced diameter portion at an outer circumferential side of the diameter reduction portion 24A. Naturally, the annular member 18A is externally engaged and directly fixed to the concave groove 25A of the pipe 11A without going through something corresponding to the shielding member 15 of embodiment 1. The outer circumferential surface of the annular member 18A continues substantially on the same plane as the areas of the outer circumferential surface of the pipe 11A before and after the annular member 18A, without any difference in level. The diameter reduction portion 24A is formed as the diameter of the annular member 18A is reduced, which is the same as in embodiment 1.

The inner circumferential surface of the diameter reduction portion 24A contacts the electric wires 12, and the electric wires 12 are held by the diameter reduction portion 24A. Because of this, in the same manner as in embodiment 1, rattling of the electric wires 12 within the pipe 11A can be effectively suppressed.

Embodiment 3

Figure 7:
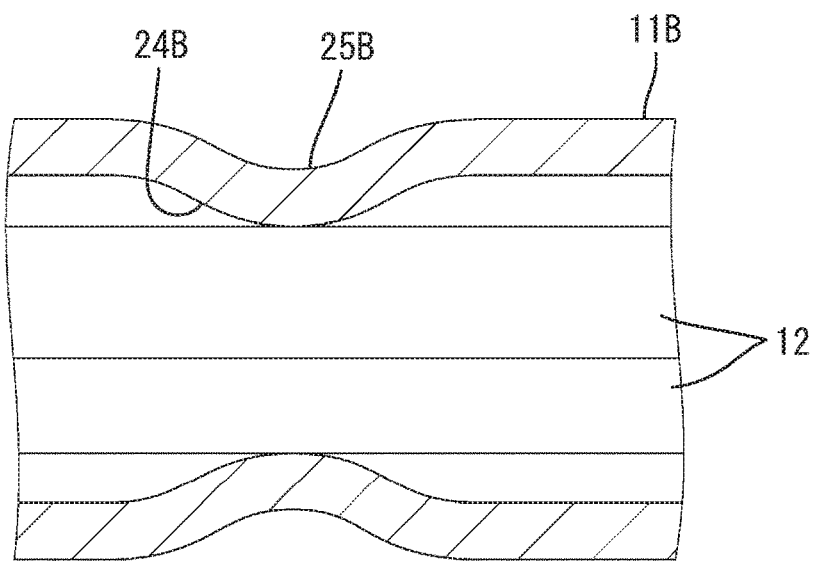
FIG. 7 a cross-sectional view of main parts of a wire harness in a side view direction related to embodiment 3 of this invention.

FIG. 7 shows embodiment 3 of this invention.

In the same manner as in embodiment 2, the diameter reduction portion 24B of this case is arranged at an intermediate portion of pipe 11B in the longitudinal direction, instead of the end portion of the pipe 11B. The pipe 11B does not have anything corresponding to the expansion portion 26 of embodiment 1. The concave groove 25B that becomes a reduced diameter portion of the diameter reduction portion 24B on the outer circumferential side is exposed to the outside. Here, something corresponding to the annular member 18 of embodiment 1 is not externally engaged and fixed. The entire surface of the diameter reduction portion 24B is bent and formed substantially in a U shape in cross section, inward in the diameter direction, by applying a compressive force to the intermediate portion of the pipe 11B, in the longitudinal direction, by an undepicted press mold (the same structure as in embodiment 1). The inner circumferential surface of the diameter reduction portion 24B contacts the electric wires 12, and the electric wires 12 are held by the diameter reduction portion 24B. According to embodiment 3, by using a more simplified structure, rattling of the electric wires 12 within the pipe 11B can be suppressed.

OTHER EMBODIMENTS

The following briefly explains other embodiments.

(1) It is acceptable that a plurality of diameter reduction portions are arranged at intervals in the longitudinal direction of the pipe.

(2) It is acceptable that a plurality of diameter reduction portions are arranged at intervals, one or more of the diameter reduction portions not being continuous in the circumferential direction of the pipe (that is, not extending around the entire circumference of the pipe). For example, two first diameter reduction portions, spaced from each other in the longitudinal direction of the pipe, may each extend only partially around the pipe circumference on one side, and a second diameter reduction portion, positioned between the first diameter reduction portions, may extend only partially around the pipe circumference on the opposite side.

(3) A configuration is acceptable in which the diameter reduction portion is extended in a flange shape, inward in the diameter direction, so as to narrow the open end at the end portion of the pipe.

(4) A configuration is acceptable in which the protrusion amount (deformation amount) in the diameter reduction direction is unevenly varied in the circumferential direction.

(5) It is acceptable that the electric wires are arranged so as to be separated from each other without contacting the inner circumferential surface of the diameter reduction portion in an ordinary arrangement configuration.

(6) The pipe may be of resin.

(7) As long as there is no interference with the annular member, the swelling portion of the grommet is not necessary.

EXPLANATION OF THE SYMBOLS

10 Wire harness
11, 11A, 11B Pipes
12 Electric wires
14 Electric wire insertion space
15 Shielding member
18, 18A Annular members
19 Grommet (covering member)
24, 24A, 24B Diameter reduction portions
26 Expansion portion

What is claimed is:

1. A wire harness, comprising:
    a pipe that has an electric wire insertion space through which an electric wire can be inserted, the pipe including a metal layer and a resin layer;
    a tubular shielding member that covers a periphery of the electric wire that extends beyond an end portion of the pipe; and
    an annular member that fixes the shielding member to the end portion of the pipe, wherein:
    the end portion of the pipe includes a diameter reduction portion, the diameter reduction portion being defined by an inward deformation of the pipe in a diameter direction that narrows the electric wire insertion space, and
    the shielding member is fixed between the metal layer and the annular member at an outer circumferential surface of the end portion of the pipe.

2. The wire harness as set forth in claim 1, further comprising a tubular covering member that is fixed to the pipe, wherein:
    the covering member covers the annular member.

3. The wire harness as set forth in claim 2, wherein the end portion of the pipe expands toward an open end of the pipe.

4. The wire harness as set forth in claim 1, wherein the end portion of the pipe expands toward an open end of the pipe.

* * * * *